United States Patent
McDonnell et al.

(10) Patent No.: US 9,835,208 B2
(45) Date of Patent: Dec. 5, 2017

(54) CLUTCH ENGAGEMENT FOR A TRANSMISSION WHEN IN PARK

(71) Applicant: FORD GLOBAL TECHNOLOGIES, LLC, Dearborn, MI (US)

(72) Inventors: Alexander Phillip McDonnell, Dexter, MI (US); Stephen Michael Cicala, Dearborn Heights, MI (US); Charles William Suter, South Lyon, MI (US); Conor Edward Sullivan, Canton, MI (US); Oguz Hasan Dagci, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 104 days.

(21) Appl. No.: 15/012,230

(22) Filed: Feb. 1, 2016

(65) Prior Publication Data
US 2017/0219028 A1    Aug. 3, 2017

(51) Int. Cl.
| | |
|---|---|
| B60W 10/115 | (2012.01) |
| B60W 10/02 | (2006.01) |
| F16H 48/06 | (2006.01) |
| F16D 48/06 | (2006.01) |
| B60W 10/06 | (2006.01) |
| B60W 30/18 | (2012.01) |

(Continued)

(52) U.S. Cl.
CPC .......... *F16D 48/062* (2013.01); *B60W 10/02* (2013.01); *B60W 10/06* (2013.01); *B60W 10/115* (2013.01); *B60W 30/18054* (2013.01); *F16D 25/12* (2013.01); *F16D 25/14* (2013.01); *F16D 48/066* (2013.01); *F16H 61/0202* (2013.01); *B60W 2710/021* (2013.01); *B60W 2710/06* (2013.01); *F16H 3/66* (2013.01); *F16H 2200/0069* (2013.01); *F16H 2200/2012* (2013.01); *F16H 2200/2046* (2013.01)

(58) Field of Classification Search
CPC ............... B60W 10/06; B60W 10/115; B60W 2710/021; B60W 2710/06; B60W 2710/1005; B60W 2510/06; B60W 30/18027; B60W 30/18018; B60W 30/18054; F16H 2312/022; F16H 2306/18
See application file for complete search history.

(56) References Cited

U.S. PATENT DOCUMENTS

| | | | |
|---|---|---|---|
| 5,181,431 A * | 1/1993 | Zaiser | F16H 3/006 192/48.609 |
| 7,878,944 B2 * | 2/2011 | Ozeki | F16H 61/0437 477/115 |

(Continued)

*Primary Examiner* — Ramya Burgess
*Assistant Examiner* — David Morris
(74) *Attorney, Agent, or Firm* — James Dottavio; Brooks Kushman P.C.

(57) ABSTRACT

A transmission includes a first hydraulic clutch, a second hydraulic clutch, a third hydraulic clutch, a pump and a controller. The first, second, and third hydraulic clutches are configured to established a parked-ready condition upon engagement of all three clutches. The pump is configured to generate hydraulic fluid pressure. The controller is programmed to, in response to a command to start an engine that powers the pump, engage the first and second clutches. The controller is further programmed to, in response to engagement of the first and second clutches and obtaining operating hydraulic fluid pressure, engage the third clutch.

20 Claims, 3 Drawing Sheets

(51) Int. Cl.
    *F16D 25/12*     (2006.01)
    *F16D 48/02*     (2006.01)
    *F16H 61/02*     (2006.01)
    F16H 3/66     (2006.01)

(56) References Cited

U.S. PATENT DOCUMENTS

| | | |
|---|---|---|
| 8,099,204 B2 | 1/2012 | Snyder et al. |
| 8,566,007 B2 | 10/2013 | Shoda et al. |
| 8,798,836 B2 | 8/2014 | Takamura et al. |
| 8,989,978 B2 | 3/2015 | Nedorezov et al. |
| 9,187,096 B2 * | 11/2015 | Neelakantan ... B60W 30/18045 |
| 9,610,940 B2 * | 4/2017 | Ortmann ............... B60W 20/40 |
| 2008/0081737 A1 * | 4/2008 | Ozeki ................. F16H 61/0437 |
| | | 477/116 |
| 2011/0098153 A1 * | 4/2011 | Tsuzuki ................ B60W 10/02 |
| | | 477/168 |
| 2013/0263683 A1 * | 10/2013 | Neelakantan ....... F16H 61/0246 |
| | | 74/335 |
| 2016/0305522 A1 * | 10/2016 | Fukao .................... B60K 17/00 |
| 2017/0015308 A1 * | 1/2017 | Ortmann ............... B60W 20/40 |

\* cited by examiner

CLUTCH ENGAGEMENT FOR A TRANSMISSION WHEN IN PARK

TECHNICAL FIELD

The present disclosure relates to transmissions and the engagement of various elements within the transmission.

BACKGROUND

Shifting a transmission from park to reverse, drive, or any other selectable gear may lead to audible and tactile responses if the shift causes a sudden acceleration or deceleration of the internal components (gears, shafts, clutches, etc.) of the transmission. This audible and tactile response may in turn detract from an operator's comfort levels while operating the vehicle or the operator's level of satisfaction in the vehicle's performance.

SUMMARY

A transmission includes a first hydraulic clutch, a second hydraulic clutch, a third hydraulic clutch, a pump and a controller. The first, second, and third hydraulic clutches are configured to established a parked-ready condition upon engagement of all three clutches. The pump is configured to generate hydraulic fluid pressure. The controller is programmed to, in response to a command to start an engine that powers the pump, engage the first and second clutches. The controller is further programmed to, in response to engagement of the first and second clutches and obtaining operating hydraulic fluid pressure, engage the third clutch.

A method of establishing a parked-ready condition of a vehicle includes engaging first and second transmission clutches in response to initiation of an engine start, generating a hydraulic pressure via a pump powered by the engine, and engaging a third transmission clutch after engaging the first and second clutches and after the hydraulic pressure exceeds a threshold. The engagement of the first, second, and third clutches establishes a parked-ready condition of the vehicle.

A vehicle transmission controller includes input channels, output channels, and control logic. The input channels are configured to receive signals indicative of an engine starting, engagement of a first transmission clutch, engagement of a second transmission clutch, and a pressure of a transmission fluid. The output channels are configured to send commands to engage the first transmission clutch, the second transmission clutch, and a third transmission clutch. The control logic is configured to command engagement of the first and second clutches upon initiation of the engine starting. The control logic is further configured to generate the command to activate the third clutch after engaging the first and second clutches and after obtaining a desired transmission fluid pressure. The engagement of the first, second, and third clutches establishes a parked condition of the transmission.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
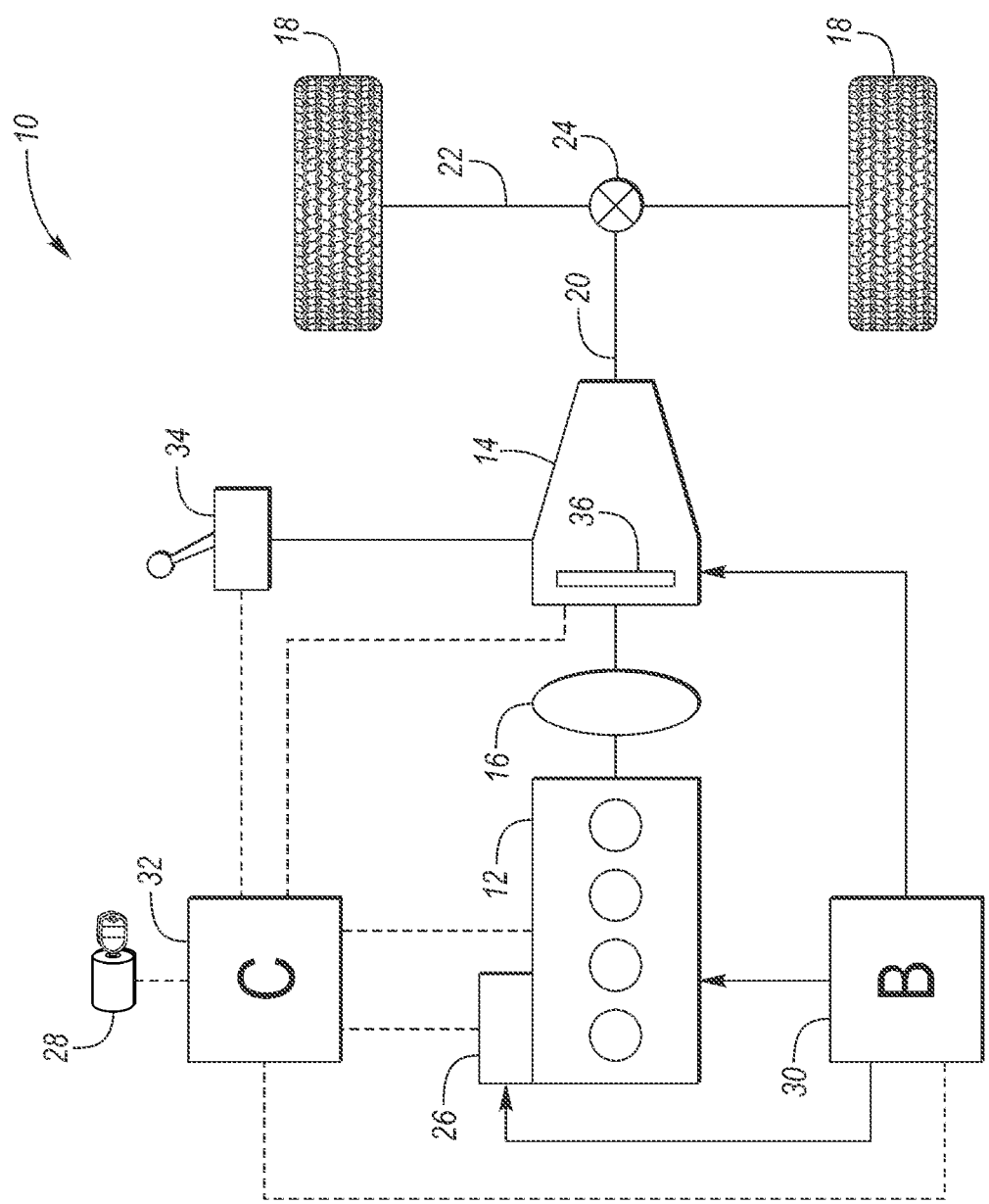
FIG. 1 is a schematic representing an exemplary vehicle.

Referring to FIG. 1, an exemplary vehicle 10 is illustrated. The vehicle 10 may include an engine 12. The engine 12 may be connected to a transmission 14. The transmission 14 may include a plurality of moving parts such as shafts, gears, clutches, etc. The transmission 14 may be shiftable between a plurality of gearing arrangements in order to establish a plurality of gearing ratios between an input and an output of the transmission 14. A torque converter 16 may be disposed between the engine 12 and the transmission 14. Power may be transferred from the engine 12 through the torque converter 16 and transmission 14 to the wheels 18 of the vehicle 10. A driveshaft 20, a pair of half shafts 22, and a differential 24 may mechanically link the transmission 14 to the wheels 18 such that power may be transferred from the engine 12, through the transmission 14, and to the wheels 18.

An engine starter motor 26 may be utilized to start the engine 12. An ignition switch 28 may be manually operated by a user to initiate the starter motor 26 in order to start the engine 12. A battery 30 may supply electrical power to the starter motor 26 upon detection of anngine start request from the ignition switch 28. The battery 30 may also supply electrical power to the engine 12 in order generate the spark (via spark plugs) to ignite fuel during combustion. The ignition switch 28 may be directly hardwired to the starter motor 26 and the battery 30. Alternatively, the ignition switch 28 may communicate with a controller 32 which in turn communicates with the starter motor 26 and/or battery 30 upon detection of a signal from the ignition switch 28 requesting an engine start. The controller 32 includes input channels that receive electrical signals from the starter motor 26, ignition switch 28, and battery 30. The electrical signals received from the starter motor 26, ignition switch 28, and battery 30 may be indicative of various states or conditions of the respective components, or the electrical signals received may be indicative of a request or a command to change or alter a state of one or more of the respective components. The controller 32 includes output channels that are configured to deliver requests or commands (via electrical signals) to the starter motor 26, ignition switch 28, and battery 30. The controller 32 includes control logic and/or algorithms that are configured to generate the requests or commands delivered through the output channels based on the requests, commands, conditions, or states of the starter motor 26, ignition switch 28, and battery 30.

While illustrated as one controller, the controller 32 may be part of a larger control system and may be controlled by various other controllers throughout the vehicle 10, such as a vehicle system controller (VSC). It should therefore be understood that the controller 32 and one or more other controllers can collectively be referred to as a "controller" that controls various actuators in response to signals from various sensors to control functions the vehicle 10 or vehicle subsystems. The controller 32 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 32 in controlling the vehicle 10 or vehicle subsystems.

Control logic, algorithms, or functions performed by controller 32 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 32. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

A gear shifter 34 may be configured to transition the transmission 14 between a variety of gear selections. For example, the gear shifter may be configured to transition the transmission 14 between park, reverse, neutral, drive, low, sport, or any other known possible gear selection of a transmission known in the art. The gear shifter 34 may communicate with the controller 32 via input and output channels.

The transmission 14 may include a hydraulic pump 36 that is configured to pressurize hydraulic fluid within the transmission 14 and/or the torque converter 16. The hydraulic pump 36 may be powered by the engine 12. The transmission 14 may include a series of electrical valves (described in further detail below) that are configured to allow pressurized hydraulic fluid to flow into and out of a series of clutches within the transmission in order to engage and disengage clutches to establish a desired gear selection and/or a desired gear ratio between the input and output of the transmission 14. The transmission 14 may include a series of sensors, such as speed sensors, torque sensors, pressure sensors, etc. that are configured to communicate various states or conditions of the transmission 14 or elements within the transmission to the controller 32. For example, the speed sensors may detect the speeds of various shafts within the transmission, the torque sensors may detect the torque of various gears or shafts within the transmission, and the pressure sensors may detect the pressure of the hydraulic fluid. The controller 32 may be configured to receive the various states or conditions of the transmission 14 via electrical signals. The electrical signals may be delivered to the controller 32 from the transmission 14 via input channels. Additionally, the electrical signals received from transmission 14 may be indicative of a request or a command to change or alter a state of one or more of the respective components of the transmission 14. The controller 32 includes output channels that are configured to deliver requests or commands (via electrical signals) to the transmission 14. The controller 32 includes control logic and/or algorithms that are configured to generate the requests or commands delivered through the output channels based on the requests, commands, conditions, or states of transmission 14. The battery 30 may be configured to deliver the electrical power required to operate the sensors and electrical valves.

The input channels and output channels are illustrated as dotted lines in FIG. 1. It should be understood that a single dotted line may be representative of both an input channel and an output channel into or out of a single element. Furthermore an output channel into one element may operate as an input channel to another element and vice versa. Electrical power delivered from the battery 30 to any of the respective components is illustrated as solid arrows in FIG. 1.

Figure 2:
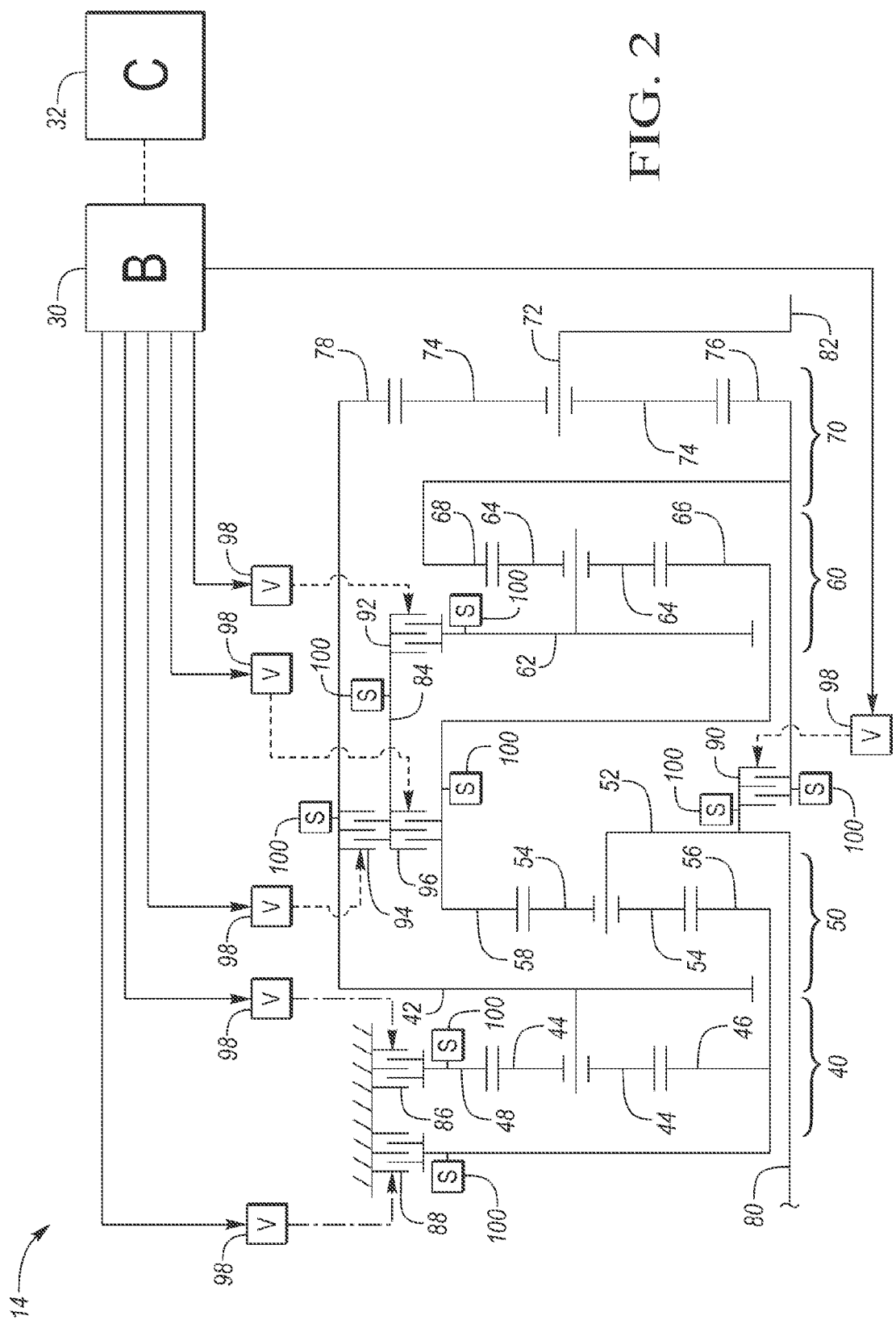
FIG. 2 is a schematic representing an exemplary transmission.

Referring now to FIG. 2, a gearing arrangement is a collection of rotating elements and clutches configured to impose specified speed relationships among elements. Some speed relationships, called fixed speed relationships, are imposed regardless of the state of any clutches. A gearing arrangement imposing only fixed relationships is called a fixed gearing arrangement. Other speed relationships are imposed only when particular clutches are fully engaged. A gearing arrangement that selectively imposes speed relationships is called a shiftable gearing arrangement. A discrete ratio transmission has a shiftable gearing arrangement that selectively imposes a variety of speed ratios between an input shaft and an output shaft.

A group of elements are fixedly coupled to one another if they are constrained to rotate as a unit in all operating conditions. Elements can be fixedly coupled by spline connections, welding, press fitting, machining from a common solid, or other means. Slight variations in rotational displacement between fixedly coupled elements can occur such as displacement due to lash or shaft compliance. In contrast, two elements are selectively coupled by a clutch when the clutch constrains them to rotate as a unit whenever the clutch is fully engaged and they are free to rotate at distinct speeds in at least some other operating condition. Clutches include actively controlled devices such as hydraulically or electrically actuated clutches and passive devices such as one way clutches. A clutch that holds an element against rotation by selectively connecting the element to the housing may be called a brake.

An example of the transmission 14 is schematically illustrated in FIG. 2. The transmission 14 utilizes four simple planetary gear sets 40, 50, 60, and 70. A simple planetary gear set is a type of fixed gearing arrangement. Referring to planetary gear set 40, a planet carrier 42 rotates about a central axis and supports a set of planet gears 44 such that the planet gears rotate with respect to the planet carrier. External gear teeth on the planet gears mesh with external gear teeth on a sun gear 46 and with internal gear teeth on a ring gear 48. The sun gear and ring gear are supported to rotate about the same axis as the carrier. A simple planetary gear set imposes a fixed speed relationship. The speed of the carrier is constrained to be between the speed of the sun gear and the speed of the ring gear. (This relationship is defined to include the condition in which all three rotate at the same speed.) More specifically, the speed of the carrier is a weighted average of the speed of the sun gear and the speed of the ring gear with weighting factors determined by the number of teeth on each gear. Similar speed relationships are imposed by other known types of fixed gearing arrangements. For example, a double pinion planetary gear set constrains the speed of the ring gear to be a weighted average between the speed of the sun gear and the speed of the carrier. Gear sets 50, 60, and 70 are similarly structured.

A suggested ratio of gear teeth for each planetary gear set is listed in Table 1.

TABLE 1

| | |
|---|---|
| Ring 48/Sun 46 | 2.20 |
| Ring 58/Sun 56 | 1.75 |
| Ring 68/Sun 66 | 1.60 |
| Ring 78/Sun 76 | 3.70 |

In the transmission 14 of FIG. 2, sun gear 46 is fixedly coupled to sun gear 56, carrier 42 is fixedly couple to ring gear 78, ring gear 58 is fixedly coupled to sun gear 66, ring gear 68 is fixedly coupled to sun gear 76, input shaft 80 is fixedly coupled to carrier 52 (which supports a set of planet gears 54 such that the planet gears rotate with respect to the planet carrier), and output shaft 82 is fixedly coupled to carrier 72 (which supports a set of planet gears 74 such that the planet gears rotate with respect to the planet carrier). Ring gear 48 is selectively held against rotation by brake 86 and sun gears 46 and 56 are selectively held against rotation by brake 88. Input shaft 80 is selectively coupled to ring gear 68 and sun gear 76 by clutch 90. Intermediate shaft 84 is selectively coupled to carrier 62 (which supports a set of planet gears 64 such that the planet gears rotate with respect to the planet carrier) by clutch 92, selectively coupled to carrier 42 and ring gear 78 by clutch 94, and selectively coupled to ring gear 58 and sun gear 66 by clutch 96.

As shown in Table 2, engaging the clutches and brakes in combinations of four establishes ten forward speed ratios and one reverse speed ratio between input shaft 80 and output shaft 82. Also, engaging, the clutches and brakes in a combination of three establishes a parked-ready condition, which is a desired condition of the transmission 14 just prior to shifting the transmission 14 from a parked condition into a forward gear or reverse gear. An X indicates that the clutch is required to establish the speed ratio or desired condition. An (X) indicates the clutch can be applied but is not required. In 1$^{st}$ gear, either clutch 94 or clutch 96 can be applied instead of applying clutch 92 without changing the speed ratio. When the gear sets have tooth numbers as indicated in Table 1, the speed ratios have the values indicated in Table 2.

TABLE 2

| | 86 | 88 | 90 | 92 | 94 | 96 | Ratio | Step |
|---|---|---|---|---|---|---|---|---|
| Parked-ready | X | X | | X | | | N/A | N/A |
| Rev | X | X | | X | X | | -4.79 | 102% |
| 1$^{st}$ | X | X | X | (X) | | | 4.70 | |
| 2$^{nd}$ | X | X | | X | | X | 2.99 | 1.57 |
| 3$^{rd}$ | X | | X | X | | X | 2.18 | 1.37 |
| 4$^{th}$ | X | | | X | X | X | 1.80 | 1.21 |
| 5$^{th}$ | X | | X | | X | X | 1.54 | 1.17 |
| 6$^{th}$ | X | | | X | X | X | 1.29 | 1.19 |
| 7$^{th}$ | | | X | X | X | X | 1.00 | 1.29 |
| 8$^{th}$ | | X | X | X | X | | 0.85 | 1.17 |
| 9$^{th}$ | | X | X | | X | X | 0.69 | 1.24 |
| 10$^{th}$ | | X | | X | X | X | 0.64 | 1.08 |

The transmission 14 includes a plurality of electrically operated hydraulic valves 98. Each valve 98 is configured to engage and disengage one of the clutches or brakes 86, 88, 90, 92, 94, and 96. The valves 98 may include a solenoid that transitions the valves 98 to an open condition to allow pressurize hydraulic fluid to flow into the clutch or brake that the specific valve is connected to in order to engage the clutch or brake. The valves 98 may also be configured to transition to a closed position to allow the pressurized hydraulic fluid to flow out of the clutch or brake that the specific valve is connected to in order to disengage the clutch or brake. The battery 30 may supply the electrical power required to open or close each valve 98. The battery 30 may receive an output signal from the controller 32 indicating a desired state (open or closed) for each valve 98 based on user input and/or control logic/algorithms that determine a desired gear selection or state of transmission 14. The transmission 14 may also include a plurality of speed sensors 100 that are configured to determine the speeds of various elements within the transmission 14. More specifically, the speed sensors 100 may be configured to detect the speeds of rotating elements that are selectively engaged to anther rotating element or are held against rotation by one of the clutches or brakes 86, 88, 90, 92, 94, and 96. The valves 98 and the speed sensors 100 may include input channels and output channels that are configured to communicate an existing state or condition of an associated transmission component to the controller 32. For example, the speed sensors 100 may communicate the relative speeds of a pair of rotating elements in the transmission 14, which may be selectively coupled to each other via one of the clutches, to the controller 32. The valves 98 may communicate the hydraulic pressure acting on a specific clutch or brake to the controller 32. The valves may also communicate to the controller 32 whether or not the clutches or brakes are in an engaged state or disengage stated. The input and output channels between the controller 32 and the valves 98 and speed sensors 100 are not shown in FIG. 2 for simplicity purposes. However, it should be understood that the input and output channels could be represented by dotted lines between the controller 32 and the valves 98 and sensor sensors 100 in a manner similar to FIG. 1.

Figure 3:
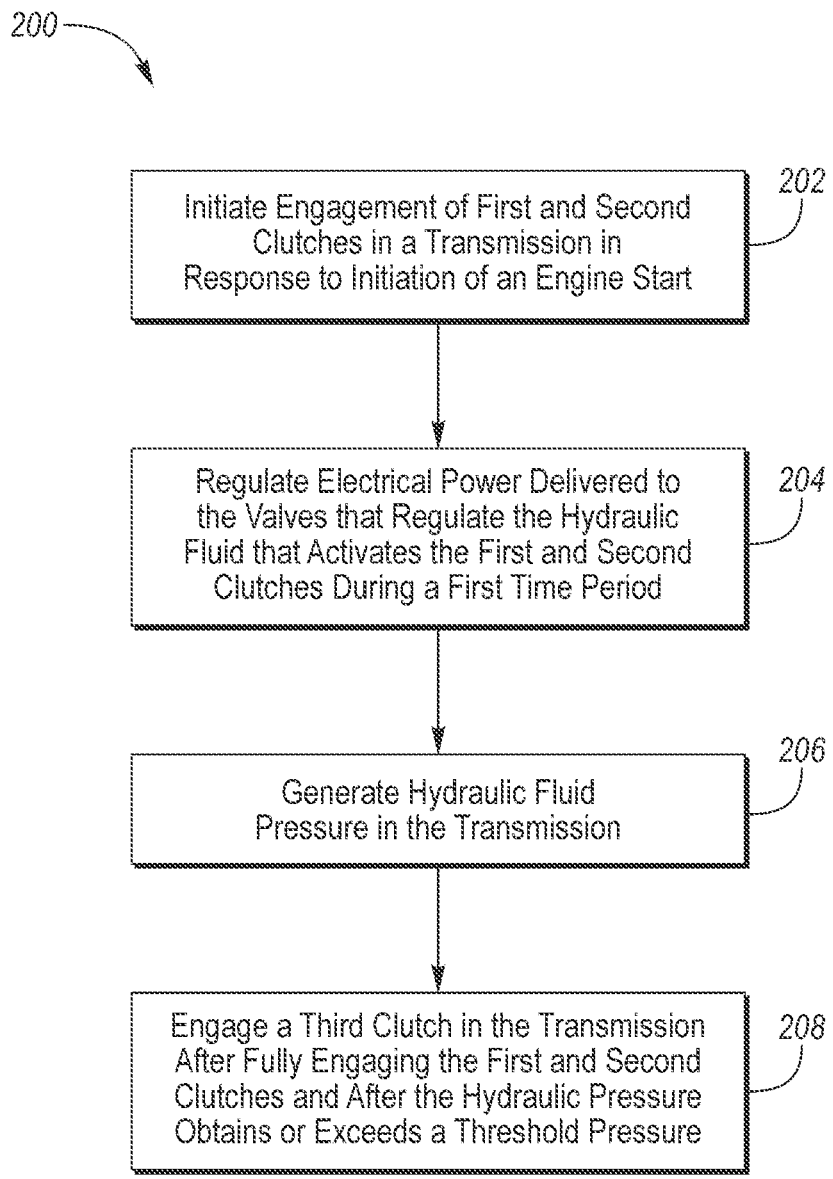
FIG. 3 is a method of establishing a parked-ready condition.

Referring to FIG. 3 a method 200 of establishing a parked-ready condition of the transmission 14 is illustrated. The parked-ready condition of the transmission 14 may refer to a neutral condition of the transmission 14 where a portion of the internal components are brought to a desired rotational speed in preparation of engaging a forward or reverse gear. Bringing some the components to a desired speed prior to shifting out of park and into a forward or reverse gear will reduce the required acceleration of the internal components when shifting out of park, which in turn will reduce the audible and tactile response that may lead to operator discomfort. The controller 32 may issue commands via the output channels from the controller 32 to the various components of the transmission 14 to execute the method 200. The commands may be based on signals received via the input channels to the controller 32 from the various components of the transmission 14 and the control logic and/or algorithms stored within the controller 32.

The method 200 begins at step 202 where the engagement of a first clutch in the transmission 14 and the engagement of a second clutch in the transmission 14 are initiated or commanded in response to an initiation or a command to the starter motor 26 to start the engine 12. The first clutch and second clutch referred to in step 202 may be brakes 86 and 88. The first and second clutches may be engaged by commanding the respective valves 98 to each clutch to open allowing pressurized hydraulic fluid to enter into the respective clutches.

Next, the method 200 moves on to step 204 where the electrical power delivered to the valves that operate the first and second clutches is regulated (or limited) during the first period of time. The first period of time corresponds to a period of time after commanding the starter motor 26 to start the engine 12 and prior to a first spark event of the engine 12. After the first spark of the engine 12, the engine 12 begins to rotate under its own combustion power and not the power from the starter motor 26. The electrical power delivered to the valves that operate the first second clutches is regulated during this first period of time to prevent depriving the starter motor 26 of the electrical power required to start the engine 12. During the first period of time, the valves that operate the first and second clutches may be opened at a slower than desired rate since the electrical power being delivered to operate the valves is limited. The electrical power delivered to the valves that operate the first and second clutches is adjusted during a second period time after the first spark event of the engine 12 has occurred to fully open the valves to allow maximum flow of hydraulic fluid into the first and second clutches such that the first and second clutches become fully engaged.

Next, at step 206, hydraulic pressure is generated in the hydraulic fluid within in the transmission 14 by the hydraulic pump 36. Although step 206 is shown to chronologically happen after steps 202 and 204, the hydraulic pump 36 begins to operate (and generate hydraulic pressure) as soon as the engine 12 is rotated by the starter motor 26 at step 202. The desired or maximum pressure of the hydraulic fluid, however, may not be obtained until the engine 12 begins to rotate under its own combustion power and not the power from the starter motor 26.

The method 200 then moves on to step 208 where a third clutch is engaged in response to the engagement of the first and second clutches and the hydraulic pressure of the hydraulic fluid in the transmission 14 obtaining an operating pressure (or exceeding a threshold pressure). Once the third clutch becomes engaged (in addition to the first and second clutches being engaged) the parked-ready condition of the transmission 14 is established. The third clutch referred to in step 208 may be clutch 92.

In step 208, the third clutch may be commanded to engage immediately after fully engaging the first and second clutches or the third clutch may be commanded to engage after a predetermined period of time after fully engaging the first and second clutches. The first and second clutches may be considered fully engaged based on a peak detection function or after the expiration of a maximum period of time after the initiation of starting the engine 12, which may be calculated by watchdog timers. The peak detection function may determine that the first and second clutches are engaged when the speeds of the opposing sides of the first clutch become synchronized and the speeds of the opposing sides of the second clutch become synchronized. The speeds of the opposing sides of the first and second clutches may be determined with the speed sensors 100.

The third clutch in step 208 may be gradually engaged by gradually increasing the hydraulic pressure on the third clutch. The hydraulic pressure may be gradually increased after initial contact of opposing sides of the third clutch by gradually opening the valve that activates the third clutch. The third clutch may be activated in an open loop manner using a standard clutch profile of boost, stroke, ramp, and end ramp. The standard clutch profile includes boosting the hydraulic pressure and stroking a clutch piston at an increased (or boost) hydraulic pressure during a first period to engage the opposing sides (or clutch plates) of the third clutch. The boost pressure is maintained until there is an initial contact between the opposing sides of the third clutch. Once there is an initial contact between the opposing sides of the third clutch, the hydraulic pressure acting on the clutch is lowered to a value below the boost pressure. Next, the hydraulic pressure is gradually increased (or ramped) during a second period (or ramping period) after the opposing sides of the clutch have come into contact and the pressure has dropped below the boost pressure. During the ramping period, the slip between the opposing sides of the third clutch is gradually reduced until there is no slip and the opposing sides of the third clutch become synchronized. Once the opposing sides of the third clutch become synchronized, the hydraulic pressure increases at an increased rate during a third period (or end ramp period) until a desired hydraulic pressure is obtained on the third clutch.

If the transmission 14 is shifted out of a parked condition into a forward or reverse gear during step 208, the valve may fully open in a non-gradual manner to quickly increase the hydraulic pressure on the third clutch such that the third clutch engages in a non-gradual manner.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A transmission comprising:
   first, second, and third hydraulic clutches configured to established a parked-ready neutral condition upon engagement of all three clutches;
   a pump configured to generate hydraulic fluid pressure; and
   a controller programmed to, in response to starting an engine that powers the pump, engage the first and second clutches, and in response to engagement of the first and second clutches and hydraulic fluid pressure exceeding a threshold engage the third clutch.

2. The transmission of claim 1, further comprising first, second, and third electrically operated hydraulic valves configured to direct hydraulic fluid into the first, second, and third clutches, respectively, to the engage the first, second, and third clutches.

3. The transmission of claim 2, wherein the controller is further programmed to regulate electrical power delivered to the first and second valves to engage the first and second clutches during a period after commanding the engine to start but prior to a first spark event of the engine to prevent depriving an engine starter motor of the required electrical power to start the engine.

4. The transmission of claim 3, wherein the controller is further programmed to adjust the electrical power delivered to the first and second valves to engage the first and second clutches, respectively, during a second period after the first spark event of the engine such that the first and second valves are fully opened to allow maximum flow of hydraulic fluid into the first and second clutches to fully engage the first and second clutches.

5. The transmission of claim 4, wherein the controller is further programmed to operate the third valve to gradually increase the hydraulic pressure acting on the third clutch during engagement of the third clutch.

6. The transmission of claim 5, wherein the controller is further programmed to increase a rate at which the hydraulic pressure acting on the third clutch is increased in response to a command to shift out of a parked condition.

7. The transmission of claim 1, wherein the controller is further programmed to engage the third clutch after a predetermined period of time after the first and second clutches are engaged.

8. The transmission of claim 1, wherein the controller is further programmed to engage the first and second clutches when opposing sides of the first clutch and opposing sides of the second clutch become synchronized after initiation of starting the engine.

9. The transmission of claim 1, wherein the controller is further programmed to engage the first and second clutches after a predetermined period of time after initiation of starting the engine.

10. A method of establishing a vehicle transmission parked-ready neutral condition comprising:

engaging first and second transmission clutches via a controller in response to initiation of an engine start;

generating a hydraulic pressure via a pump powered by the engine; and engaging a third transmission clutch via the controller after engaging the first and second clutches and after the hydraulic pressure exceeds a threshold, wherein engagement of the first, second, and third clutches establishes the condition.

11. The method of claim 10, further comprising the steps of:

delivering electrical power to first and second electrically operated hydraulic valves to engage the first and second clutches, respectively; and regulating the electrical power delivered to the first and second valves during a period after initiation of starting the engine but prior to a first spark event of the engine to prevent depriving an engine starter motor of the required electrical power to start the engine.

12. The method of claim 10, wherein a third electrically operated hydraulic valve is operated to gradually increase the hydraulic pressure acting on the third clutch during engagement of the third clutch.

13. The method of claim 12, further comprising the step of increasing a rate at which the third valve increases the hydraulic pressure action on the third clutch in response to a shift out of the parked condition.

14. The method of claim 10, wherein the third clutch engages after a predetermined period of time after the first and second clutches are engaged.

15. The method of claim 10, wherein the first and second clutches are engaged when opposing sides of the first clutch and opposing sides of the second clutch become synchronized after initiation of starting the engine.

16. The method of claim 10, wherein the first and second clutches are engaged after a predetermined period of time after initiation of starting the engine.

17. A vehicle transmission controller comprising:

input channels configured to receive signals indicative of an engine starting, engagement of first and second transmission clutches, and a pressure of a transmission fluid;

output channels configured to send commands to engage the first, the second, and a third transmission clutch; and control logic configured to engage the first and second clutches via commands sent through the output channels upon receiving signals via the input channels indicative of the engine starting and to engage the third clutch via commands sent through the output channels after receiving signals via the input channels indicative of engagement of the first and second clutches and after receiving signals via the input channels indicative of obtaining a desired transmission fluid pressure such that engagement of the first, second, and third clutches establishes a parked-ready neutral condition of the transmission.

18. The controller of claim 17, wherein the control logic is further configured to engage the third clutch after a predetermined period of time after the first and second clutches are engaged.

19. The controller of claim 17, wherein the control logic is further configured to gradually engage the third clutch.

20. The transmission of claim 1, further comprising a fourth hydraulic clutch, wherein the controller is further programmed to engage the fourth hydraulic clutch, in response to engagement of the first, second, and third hydraulic clutches, and wherein engagement of the first, second, third, and fourth hydraulic clutches establishes a forward or a reverse gear of the transmission.

* * * * *